(12) United States Patent
Famosi (10) Patent No.: US 11,413,917 B1
(45) Date of Patent: Aug. 16, 2022

(54) TRAILER JACK

(71) Applicant: John Famosi, Diamond Point, NY (US)

(72) Inventor: John Famosi, Diamond Point, NY (US)

(*) Notice: Subject to any disclaimer, the term of this patent is extended or adjusted under 35 U.S.C. 154(b) by 87 days.

(21) Appl. No.: 17/172,629

(22) Filed: Feb. 10, 2021

(51) Int. Cl.
*B60D 1/66* (2006.01)
*B60S 9/22* (2006.01)
*B60S 9/04* (2006.01)
*B60D 1/60* (2006.01)

(52) U.S. Cl.
CPC .............. *B60D 1/665* (2013.01); *B60D 1/60* (2013.01); *B60S 9/04* (2013.01); *B60S 9/22* (2013.01)

(58) Field of Classification Search
CPC ........................................ B60D 1/665
USPC ........................................ 280/475
See application file for complete search history.

(56) References Cited

U.S. PATENT DOCUMENTS

| 2,205,436 | A | 6/1940 | Richards |
| 4,169,581 | A | 10/1979 | Thurmond, Jr. |
| 6,659,696 | B2 * | 12/2003 | Hoffnung ............ B60B 33/0039 16/34 |
| 7,396,034 | B2 | 7/2008 | Wilson, Jr. |
| 7,954,829 | B2 | 6/2011 | Von Tersch |
| 8,016,257 | B2 | 9/2011 | Di Biase |
| 8,876,085 | B2 * | 11/2014 | Harper ................ B23P 11/00 254/423 |
| 9,156,667 | B2 | 10/2015 | Ebbenga et al. |
| 10,252,381 | B2 * | 4/2019 | Harper ..................... B60S 9/06 |
| 2006/0119072 | A1 * | 6/2006 | Riedl ...................... B60S 9/04 280/475 |
| 2007/0181864 | A1 | 8/2007 | Bartee |
| 2009/0236577 | A1 | 9/2009 | Pollock et al. |
| 2010/0177038 | A1 | 7/2010 | Misawa |

FOREIGN PATENT DOCUMENTS

| DE | 102010025962 A1 * | 1/2012 | ............... B60D 1/66 |
| DE | 102011013205 A1 * | 9/2012 | ............ B60D 1/665 |
| EP | 1038740 A1 | 9/2000 | |

OTHER PUBLICATIONS

Crown Product, Trailer Stabilizing Jack, Catalog Page, Copyright 2021, Accessed Feb. 10, 2021; https://crownproducts.theonlinecatalog.com/products/trailer-stabilizing-jack/.

* cited by examiner

*Primary Examiner* — Kevin Hurley
*Assistant Examiner* — Hosam Shabara
(74) *Attorney, Agent, or Firm* — Heslin Rothenberg Farley & Mesiti P.C.

(57) ABSTRACT

A wheeled trailer jack including a first foot pad and a second foot pad. The first foot pad including a first base and the second foot pad including a second base. The first and second foot pads rotatable between an engaged position and an unengaged position. When in the engaged position, the first base of the first foot pad and the second base of the second foot lie in substantially the same plane to act as a flat foot pad to stabilize the wheeled trailer jack and wheel chock to prevent a wheel of the wheeled trailer jack from moving. When in the unengaged position, the wheel of the wheeled trailer jack is free to move.

16 Claims, 10 Drawing Sheets

TRAILER JACK

BACKGROUND OF THE INVENTION

Technical Field

The present invention generally relates to trailer jacks and, more particularly, a dual mode trailer jack capable of switching between a wheeled trailer jack and a flat pad trailer jack.

Background Information

Trailers and trailer jacks are well known in the prior art. Trailers are typically coupled to a powered or towing vehicle to haul various types of vehicles, equipment and cargo. Typical trailers include a frame for supporting the item(s) to be transported and a chassis supporting the frame. One or more axles are provided beneath the chassis for wheels that contact a road surface. A tongue or ball-and socket type hitch is provided at the front of the trailer frame for connection to a vehicle.

Trailers may typically have a trailer jack connected to the frame to support the tongue during hitching and unhitching to a vehicle. The trailer jack supports the tongue during hitching and prevents the tongue from digging into the ground. Trailer jacks also keep the trailer level when the trailer is not attached to the tow vehicle and stabilizes the trailer for loading and unloading and when the trailer is parked. Trailer jacks typically include a crank that will extend the jack to raise the trailer frame and retract the jack to lower the trailer frame, which aids in hitching and unhitching the trailer to a vehicle. The bottom end of the trailer jack which contacts the ground typically includes either a wheel (e.g. a caster wheel) or a flat foot pad.

Figure 1:
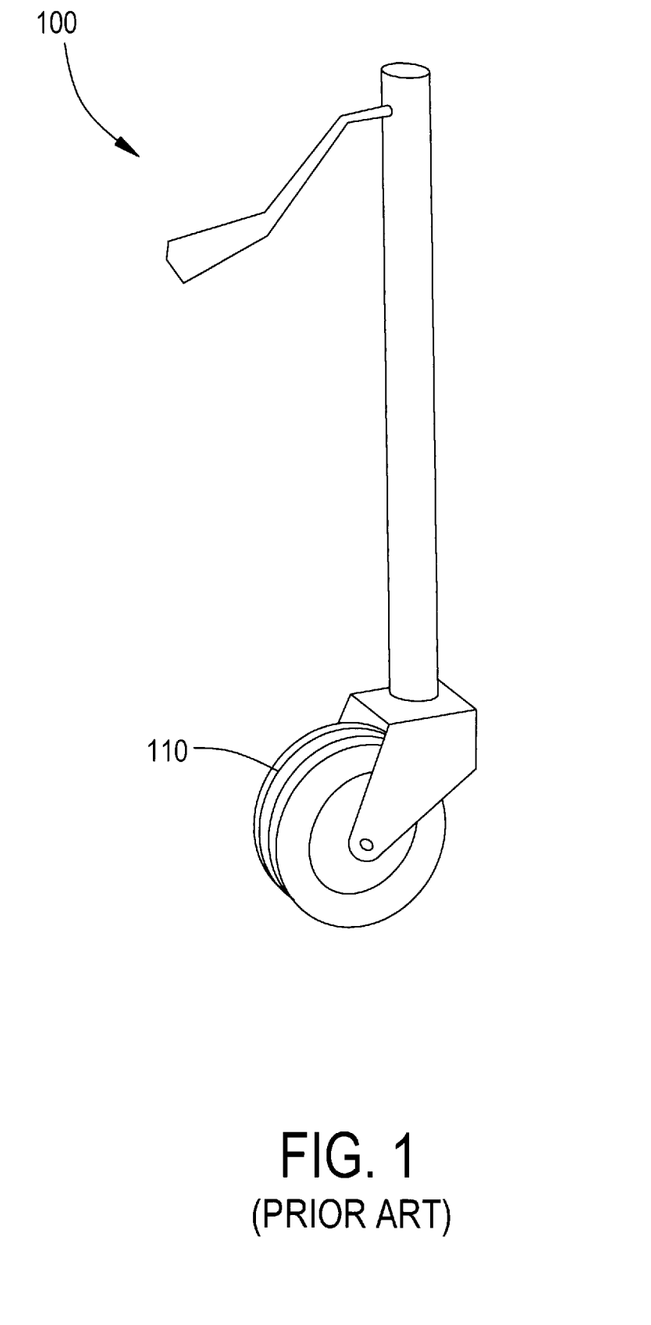
FIG. 1 depicts a prior art trailer jack having a wheel.
Figure 2:
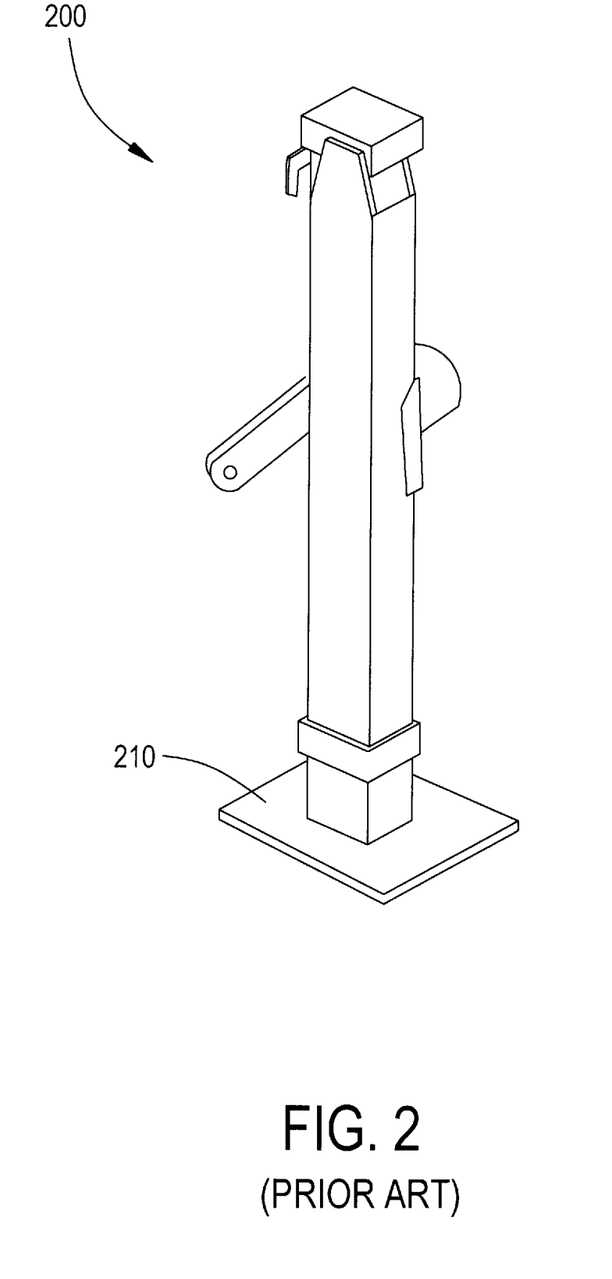
FIG. 2 depicts a prior art trailer jack having a foot pad.

A conventional wheeled trailer jack 100, as illustrated in FIG. 1, includes a wheel 110 at its bottom end. A conventional wheeled trailer jack permits movement of the trailer once it is unhitched from the vehicle. If there is no wheel, the towing vehicle must be maneuvered into position to permit engagement of a latching mechanism at the end of the tongue. Conversely, a conventional foot pad trailer jack 200, as illustrated in FIG. 2, includes a flat foot pad 210 at its bottom end. A conventional foot pad trailer jack fixes the location of the trailer and provides for a secure and non-moveable trailer.

Each of the conventional wheeled and foot pad trailer jacks has its advantages and disadvantages. While a conventional wheeled trailer jack will permit a user to move the trailer on flat ground, the wheel will often become embedded in soft ground or soft asphalt if the trailer is unhitched at such a location. To avoid movement of a trailer having a conventional wheeled jack, wheel chocks are commonly positioned on the trailer wheel(s). However, chocks become misplaced or forgotten which raises the likelihood of a trailer equipped with only a conventional wheeled trailer jack rolling or other mishap. While a conventional foot pad trailer jack will have greater surface area for greater stability on soft ground, the trailer cannot be readily moved without lifting the foot pad off the ground.

Prior attempts to design and engineer a trailer jack having a wheel and a foot pad have resulted in complicated designs that are very expensive to manufacture and operate and require lifting of the tongue or hitch portion of a trailer. There is, therefore, a need for an efficiently designed trailer jack.

SUMMARY OF THE INVENTION

The shortcomings of the prior art are overcome, and additional advantages are provided, through use of a trailer jack constructed in accordance with one or more aspects of the present invention. A trailer jack constructed in accordance with one or more aspects of the present invention includes, in one aspect, rotatable foot pads that allow a trailer owner to change from a wheeled to a flat jack without removing a component and whither wheel chocks. The rotatable foot pads may be used with any type of wheel trailer jack. Additionally, other uses may be made of the invention that fall within the scope of the claimed invention but are not specifically described below.

In one aspect of the invention, there is provided a trailer jack comprising a shaft and a trailer foot pad. The shaft is mountable to a trailer body and includes an end having two struts that support a wheel rotatably mounted therebetween on an axle. The trailer foot pad includes a first foot pad and a second foot pad. The first foot pad is removably and rotatably secured to the axle. The first foot pad includes a first base and a pair of flanges, mutually parallel and spaced apart to admit the wheel, attaching perpendicular to the first base. Each flange includes a first end proximate to the first base and an opposite second end. The second end of each flange has a hole configured to receive the axle. The first base includes a first recess centrally located along an inner side. The first foot pad is rotatable between a first engaged position and a first unengaged position. A portion of one side of the wheel is received by the first recess and contacts the first base in the first engaged position.

The second foot pad is removably and rotatably secured to the axle. The second foot pad includes a second base and a pair of flanges, mutually parallel and spaced apart to admit the wheel, attaching perpendicular to the second base. Each flange includes a first end proximate to the second base and an opposite second end. The second end of each flange has a hole configured to receive the axle. The second base includes a second recess centrally located along an inner side. The second foot pad is rotatable between a second engaged position and a second unengaged position. A portion of an opposing side of the wheel is received by the second recess and contacts the second base in the second engaged position.

In another aspect, the first base of said first foot pad and the second base of the second foot pad lie substantially in the same plane when said first foot pad is in the first engaged position and said second foot pad is in the second engaged position.

In yet another aspect, the first foot pad in the first engaged portion is detachably secured to the second foot pad in the second engaged position.

In another aspect of the invention, there is provided a trailer foot pad for removable and rotatable attachment to a wheeled trailer jack. The trailer foot pad includes a first foot pad and a second foot pad. The first foot pad is removably and rotatably securable to the wheeled trailer jack. The first foot pad includes a first base and a pair of flanges, mutually parallel and spaced apart to receive a wheel of the wheeled trailer jack, attaching perpendicular to the first base. Each flange includes a first end proximate to the first base and an opposite second end. The second end of each flange has a hole. Each hole shares the same longitudinal axis as the hole on the other flange. The first base includes a first recess centrally located along an inner side.

The second foot pad is removably and rotatably securable to the wheeled trailer jack. The second foot pad includes a second base and a pair of flanges, mutually parallel and spaced apart to receive the wheel of the wheeled trailer jack, attaching perpendicular to the second base. Each flange includes a first end proximate to the second base and an opposite second end. The second end of each flange has a hole. Each hole shares the same longitudinal axis as the hole on the other flange. The second base includes a second recess centrally located along an inner side. When assembled, the first foot pad and the second foot pad are rotatable into a position in which the first base of the first foot pad and the second base of the second foot pad lie substantially in the same plane.

These, and other objects, features and advantages of this invention will become apparent from the following detailed description of the various aspects of the invention taken in conjunction with the accompanying drawings.

BRIEF DESCRIPTION OF THE DRAWINGS

The present invention will be understood more fully from the detailed description given hereinafter and from the accompanying drawings of the certain embodiments of the present invention, which, however, should not be taken to limit the invention, but are for explanation, illustration and understanding only.

DETAILED DESCRIPTION OF THE INVENTION

The present invention will be discussed hereinafter in detail in terms of various exemplary embodiments according to the present invention with reference to the accompanying drawings. In the following detailed description, numerous specific details are set forth in order to provide a thorough understanding of the present invention. It will be obvious, however, to those skilled in the art that the present invention may be practiced without some of these specific details. In other instances, well-known structures are not shown in detail in order to avoid unnecessary obscuring of the present invention.

Thus, all implementations described below are exemplary implementations provided to enable persons skilled in the art to make or use the embodiments of the disclosure and are not intended to limit the scope of the disclosure, which is defined by the claims. As used herein, the word "exemplary" or "illustrative" or "example", and derivatives thereof, means "serving as an example, instance, or illustration." Any implementation described herein as "exemplary" or "illustrative" or "example", and derivatives thereof, is not necessarily and should not be construed as preferred or advantageous over other implementations. Moreover, in the present description, the terms "upper", "lower", "left", "rear", "right", "front", "vertical", "horizontal", and derivatives thereof shall relate to the invention as oriented in FIGS. 3-7.

Furthermore, there is no intention to be bound by any expressed or implied theory presented in the preceding technical field, background, brief summary or the following detailed description. It is also understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise. While this invention is satisfied by embodiments in many different forms, there is shown in the drawings, and will herein be described in detail, one or more embodiments of the present invention with the understanding that the present disclosure is to be considered as exemplary of the principles and aspects of the invention and is not intended to limit the invention to the embodiments illustrated. The scope of the invention will be pointed out in the appended claims.

In short, a trailer jack constructed in accordance with one or more aspects of the present invention incorporates a combination foot pad and wheel chock onto a conventional wheeled trailer jack. In one embodiment, a wheel trailer jack constructed in accordance with one or more aspects of the present invention includes rotatable left and right pads that together form, when engaged, a foot pad that allows a trailer owner to change from a wheeled to a flat pad jack without removing a component, lifting any portion of a trailer and/or using independent wheel chocks. The left and right pads constructed in accordance with one or more aspects of the present invention will also act as wheel chocks. When in an engaged position, the left and right pads wedge beneath the trailer jack wheel to prevent rolling. When in an unengaged position, the trailer jack performs as a conventional wheeled trailer jack.

Referring now to FIGS. 3-7, there is shown various views of a trailer jack foot pad 300 constructed in accordance with one or more aspects of the present invention. In one embodiment, trailer jack foot pad 300 includes a first pad 310 and a second pad 350. In one example, first pad 310 and second pad 350 are, in one example, removably attachable to and rotatable on an axle of a wheel 110 used in a conventional wheeled trailer jack (see e.g. FIGS. 8-9). In alternative embodiments, first pad 310 and second pad 350 may be removably attachable and rotatable to an axle extending through a hole formed in a shaft of a wheeled trailer jack that extends laterally through the center of the shaft and perpendicular to the wheel.

In one embodiment, first pad 310 includes a first flange 312, an opposite second flange 320, and a first base 340 attached to both flanges 312 and 320. First flange 312 is mutually parallel to and spaced apart from second flange 320 capable of receiving a wheel of a wheeled trailer jack. Both first flange 312 and second flange 320 extend perpendicular from first base 340. First flange 312 includes a lateral end 314 that attaches to base 340 and a free, opposite end 316. Lateral end 314 may include an overhang portion 315 that extends beyond first base 340. Free end 316 includes a first hole 318 proximate to the perimeter of free end 316. Second flange 320 includes a lateral end 322 that attaches to first base 340 and a free end 324. Lateral end 322 may include an overhang portion 323 that extends beyond first base 340. Free end 324 includes a second hole 326 proximate to the perimeter of free end 324. In one embodiment, first hole 318 and second hole 326 are shaped, e.g. oval, curved or other shape, to, for example, allow the wheel axle of a wheeled trailer jack, when inserted therein, to slide relatively parallel relative to the top surface of first base 340 in order to, for example, facilitate securing first pad 310 in either the engaged or unengaged position, as well as facilitating the rotation of first pad 310 from one position to the other.

Figure 4:
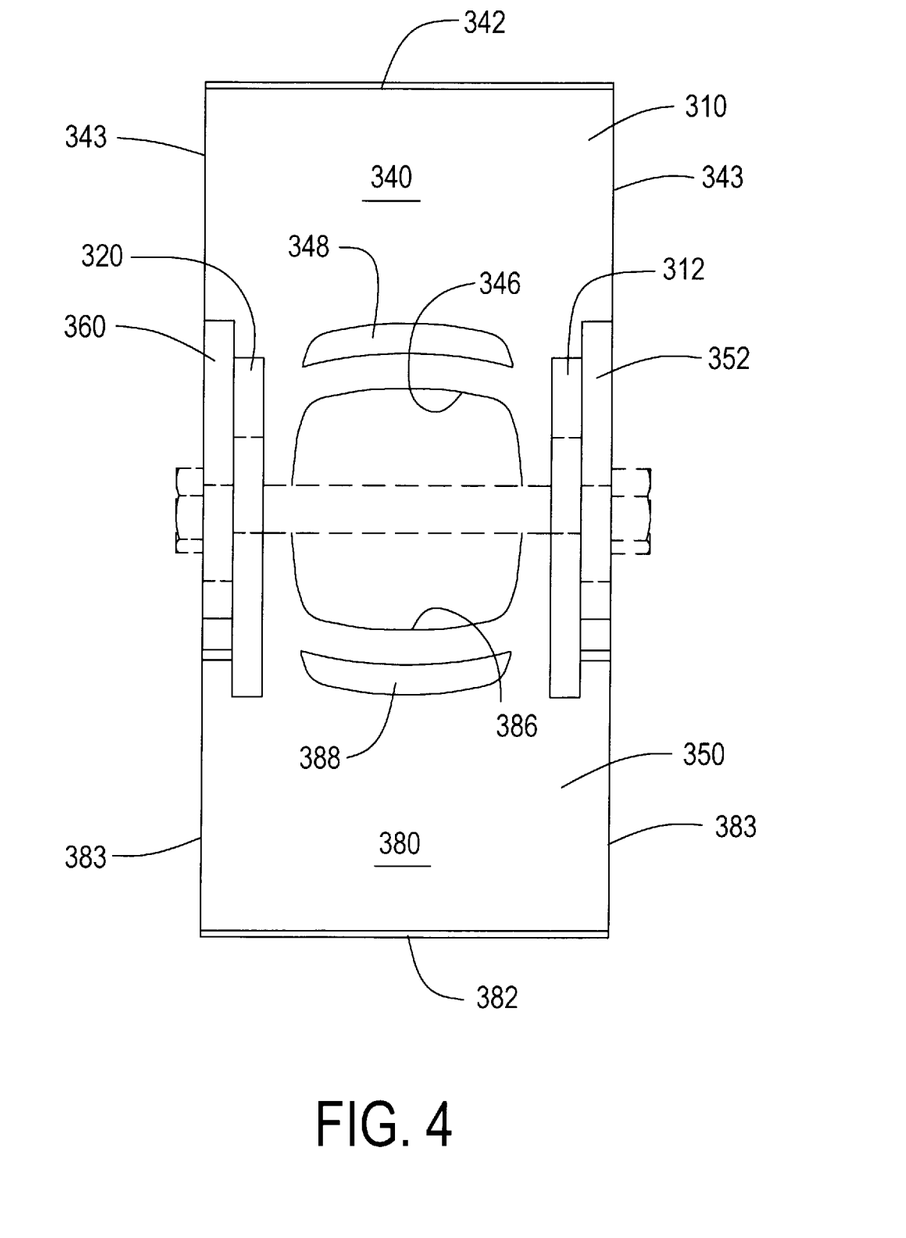
FIG. 4 depicts a top view of the trailer jack foot illustrated in FIG. 3.
Figure 5:
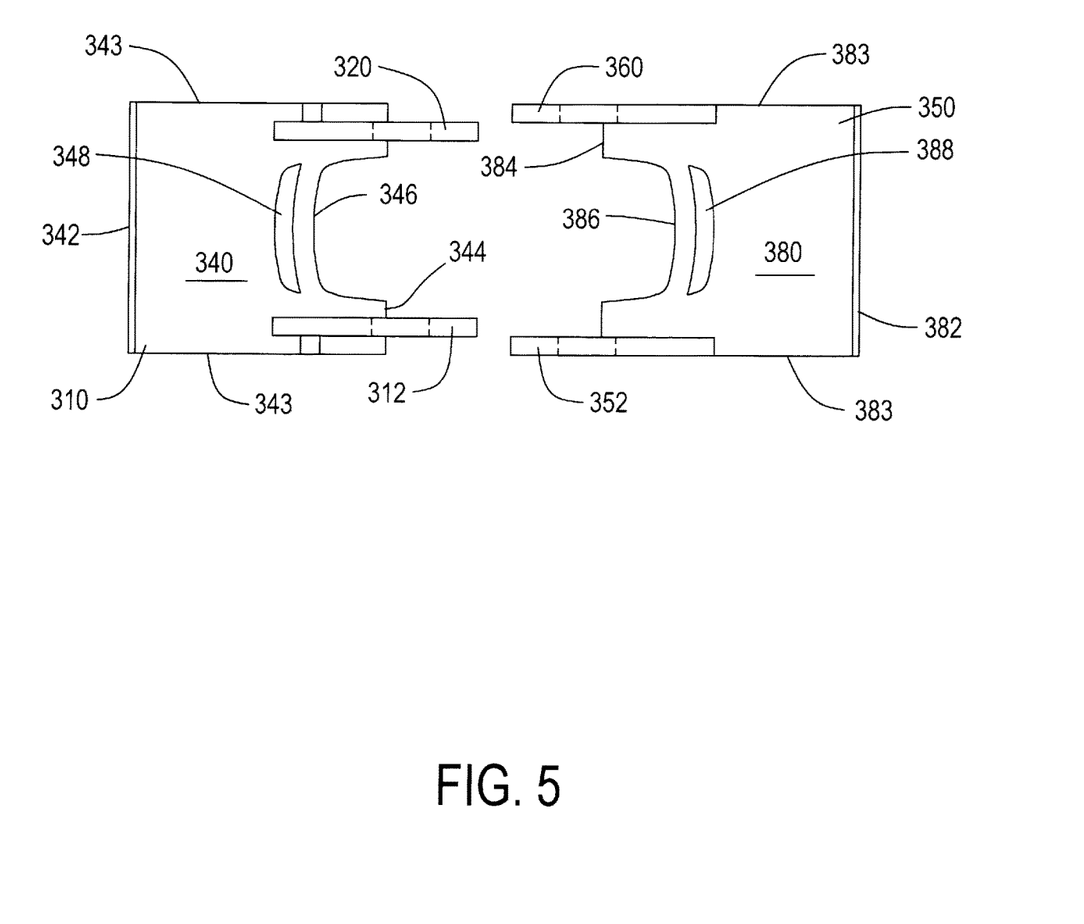
FIG. 5 depicts an exploded top view of the trailer jack foot illustrated in FIG. 3.
Figure 6:
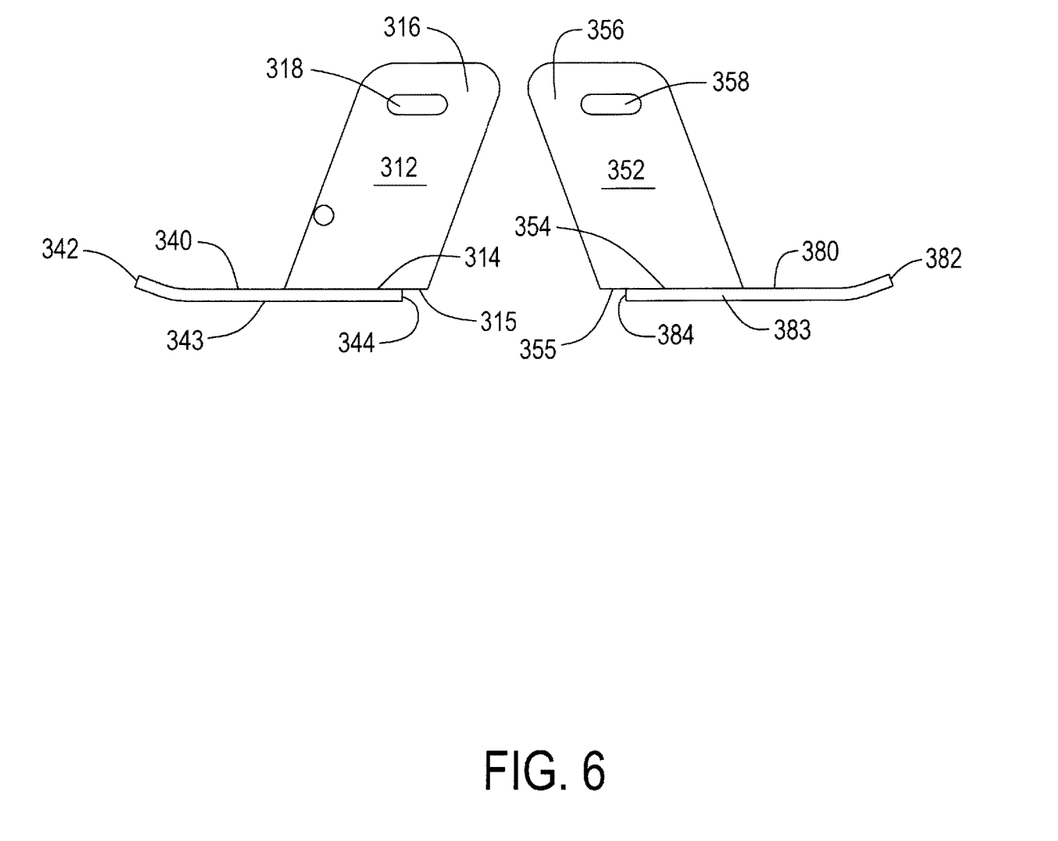
FIG. 6 depicts an exploded side view of the trailer jack foot illustrated in FIG. 3.
Figure 7:
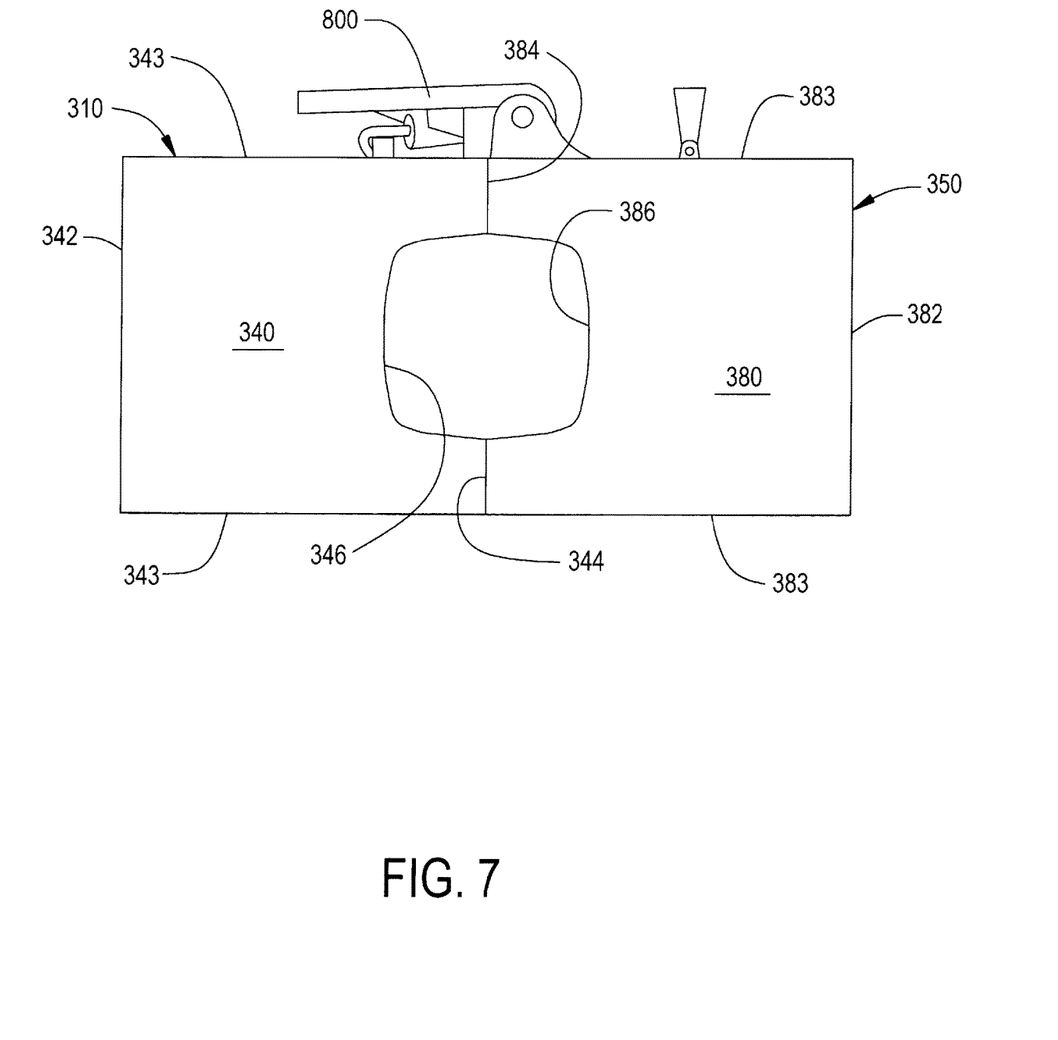
FIG. 7 depicts a bottom view of the trailer jack foot illustrated in FIG. 3.

In one example, first base 340 includes a generally rectangular shape having an outer peripheral edge 342 and an opposing inner edge 344. A U-shaped recess 346 is centrally located along, and extends inwardly from, inner edge 344 of first base 340. In one embodiment as illustrated in FIGS. 4 and 5, first pad 310 may include a raised angled portion 348 that projects upward from the top surface of first base 340 and angles away from U-shaped recess 346. Raised angled portion 348 is spaced from U-shaped recess 346 to engage a wheel of a wheeled trailer jack (see e.g. FIG. 10) and act similar to a chock when trailer jack foot pad 300 is in an engaged position.

Second pad 350 includes a first flange 352, an opposite second flange 360, and a second base 380 attached to both flanges 352 and 360. First flange 352 is mutually parallel to and spaced apart from second flange 360 capable of receiving a wheel of a wheeled trailer jack. First flange 352 includes a lateral end 354 that attaches to base 380 and a free, opposite end 356. Lateral end 354 may include an overhang portion 355 that extends beyond second base 380. Free end 356 includes a first hole 358 proximate to the perimeter of free end 356. Second flange 360 includes a lateral end 362 that attaches to second base 380 and a free end 364. Lateral end 362 may include an overhang portion 363 that extends beyond second base 380. Free end 364 includes a second hole 366 proximate to the perimeter of free end 364. In one embodiment, first hole 358 and second hole 366 are shaped, e.g. oval, curved or other shape to, for example, allow the wheel axle of a wheeled trailer jack, when inserted therein, to slide parallel relative to the top surface of second base 380 in order to facilitate securing second pad 350 in either the engaged or unengaged position, as well as facilitating the rotation of second pad 350 from one position to the other.

In one example, second base 380 includes a generally rectangular shape having an outer peripheral edge 382 and an opposing inner edge 384. A U-shaped recess 386 is centrally located along, and extends inwardly from, second base 380. In one embodiment as illustrated in FIGS. 4 and 5, second pad 350 may include a raised angled portion 388 that projects upward from the top surface of second base 380 and angles away from U-shaped recess 386. Raised angled portion 388 is spaced from U-shaped recess 386 to engage a wheel of a wheeled trailer jack (see e.g. FIG. 10) and act similar to a chock when trailer jack foot pad 300 is in an engaged position.

Figure 3:
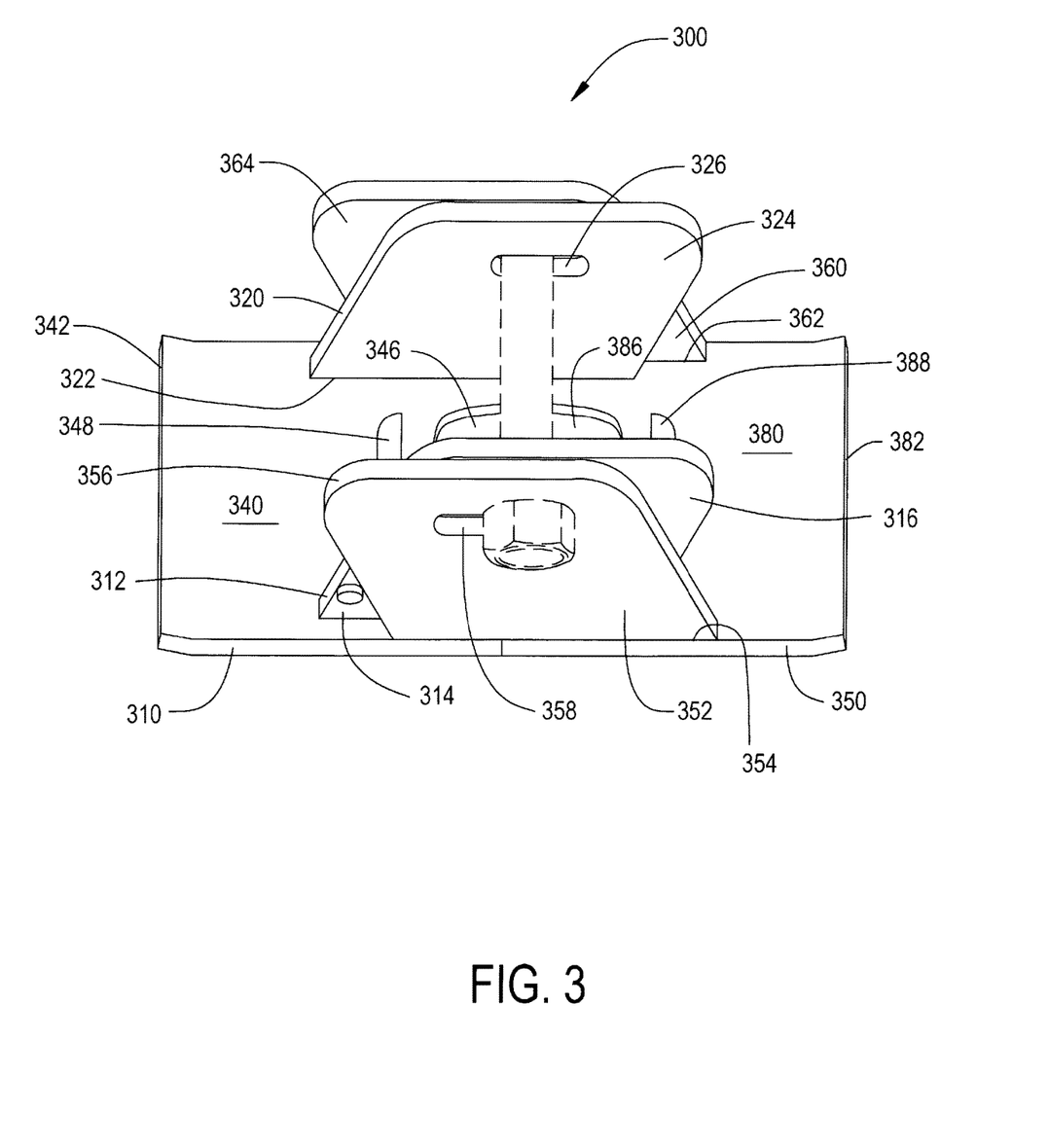
FIG. 3 depicts a perspective view of a trailer jack foot constructed in accordance with one or more aspects of the present invention.

As illustrated in FIGS. 3 and 4, when assembled, free ends 316, 324 of first and second flanges 312, 320 of first pad 310 are positioned adjacent to (e.g. on the inner sides of) free ends 356, 364 of first and second flanges 352, 360 of second pad 350 so that holes 318, 326, 358 and 366 substantially align to form a through hole for passage of, for example, a wheel axle of a wheeled trailer jack. In one example, the through hole formed by holes 318, 326, 358 and 366 of first and second pads 310, 350 align, in use, with a wheel axle or pin (or perpendicular to the wheel itself) used with a conventional wheel trailer jack. In alternative embodiments, the through hole formed by holes 318, 326, 358 and 366 of first and second pads 310, 350 may align, in use, with the longitudinal axis of a pin or other retaining member extending through a hole formed in a tubular or other shaped shaft extending between the wheel and trailer frame that allows first and second foot pads 310, 350 to rotate between an engaged position or configuration and an unengaged position or configuration, as described in more detail below.

In one embodiment, trailer jack foot pad 300 may be constructed from, for example, three eighth inch galvanized steel. In one example, outer peripheral edge 342 of first base 340 and outer peripheral edge 382 of second base 380 may turn or flare upward away from the ground in an engaged position to, for example, prevent first base 340 and/or second bases 380 from sinking into the ground during use. In another example, a portion of sides 343 of first base 340 and a portion of sides 383 of second base 380 may also turn or flare upward away from the ground in an engaged position for the same purpose.

Figure 8:
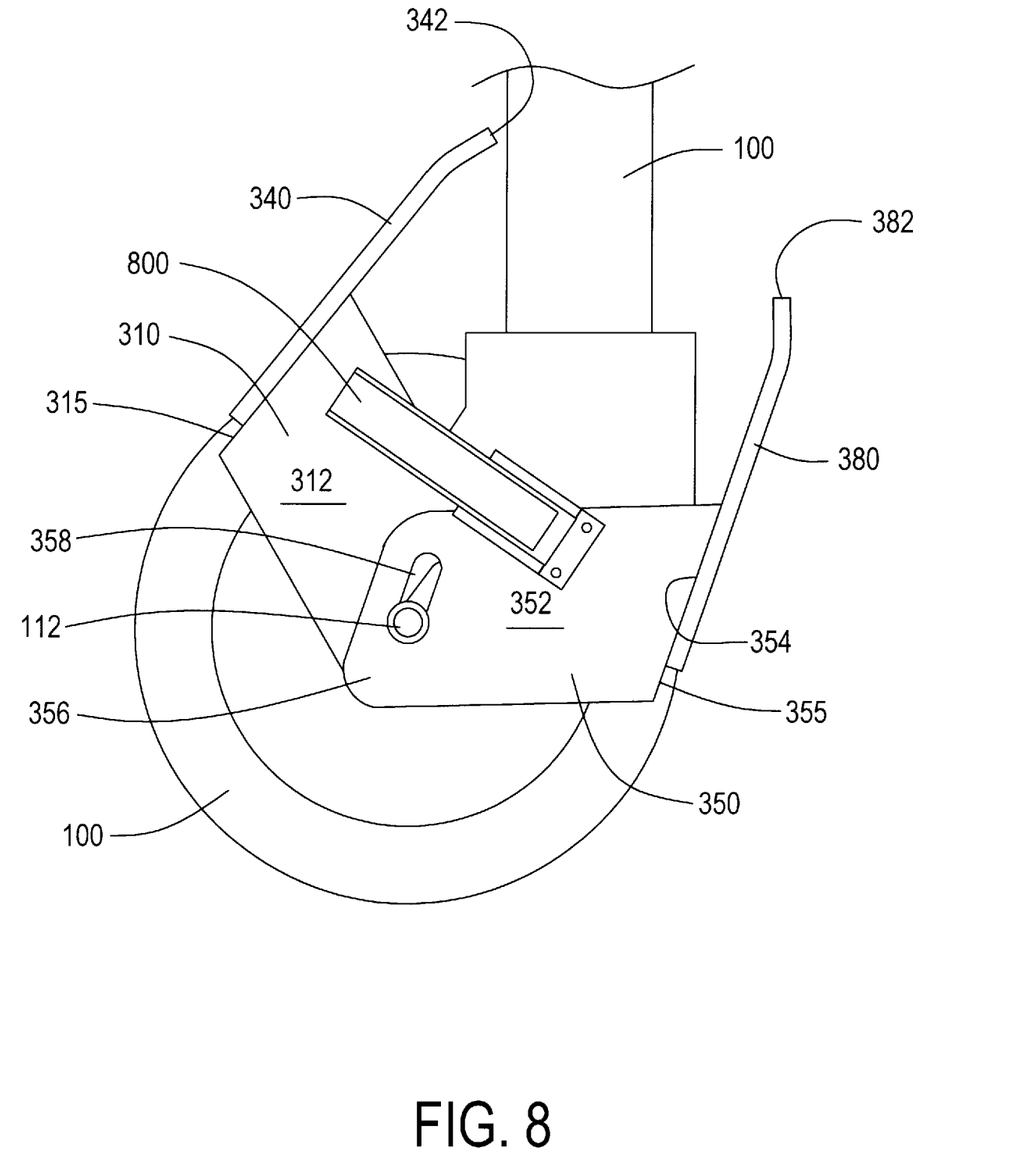
FIG. 8 depicts a side view of the trailer jack foot illustrated in FIG. 3 in an unengaged position attached to a conventional wheel trailer jack.
Figure 9:
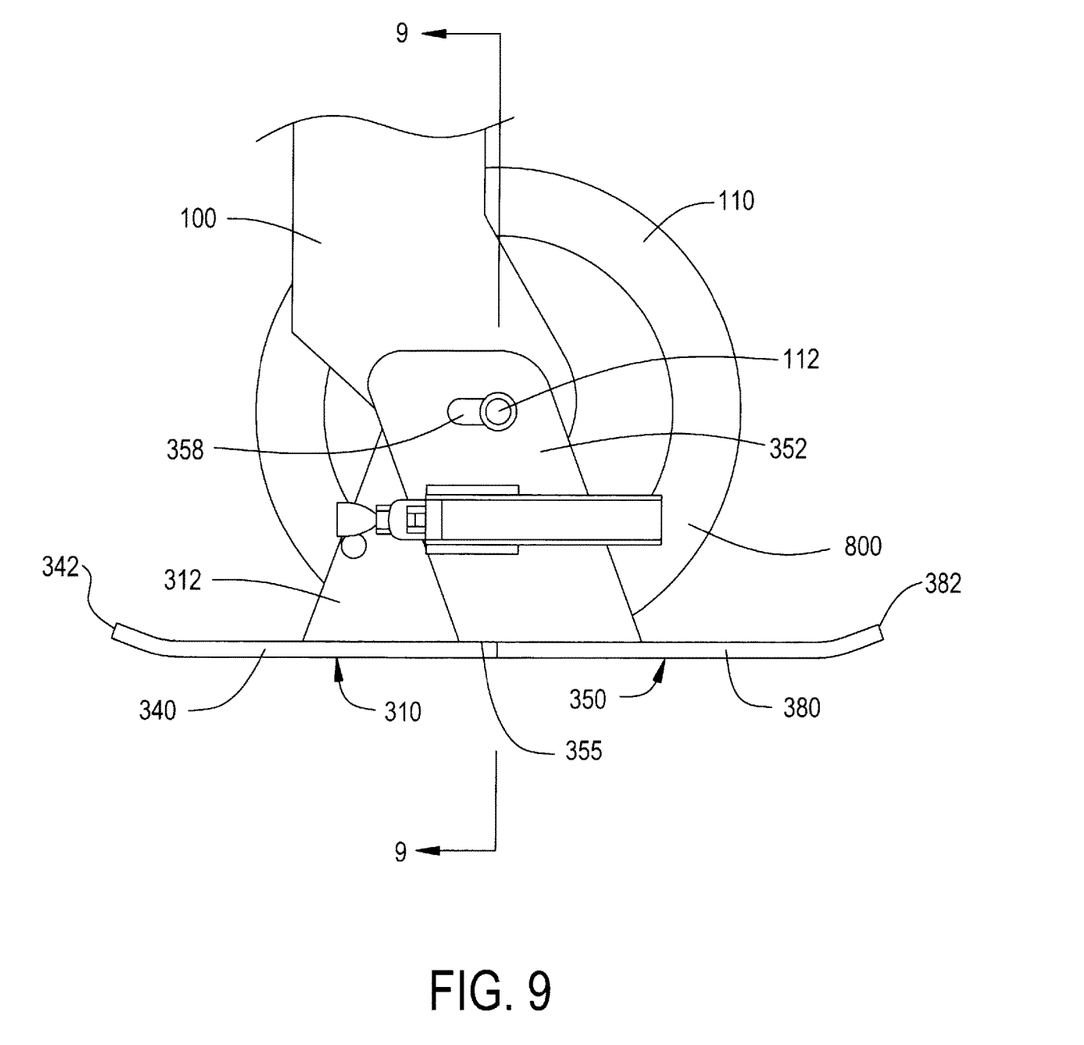
FIG. 9 depicts a side view of the trailer jack foot illustrated in FIG. 3 in an engaged position attached to a conventional wheel trailer jack.

FIGS. 8-9 illustrate one embodiment of a wheeled trailer jack 100 including a trailer jack foot pad 300 constructed in accordance with one or more aspects of the present invention that is removably and rotatably attached to a wheel axle 112 of a wheeled trailer jack 100. First pad 310 and second pad 350 are rotatable between an engaged position or configuration (see e.g. FIGS. 9-10) and an unengaged position or configuration (see e.g. FIG. 8).

Figure 10:
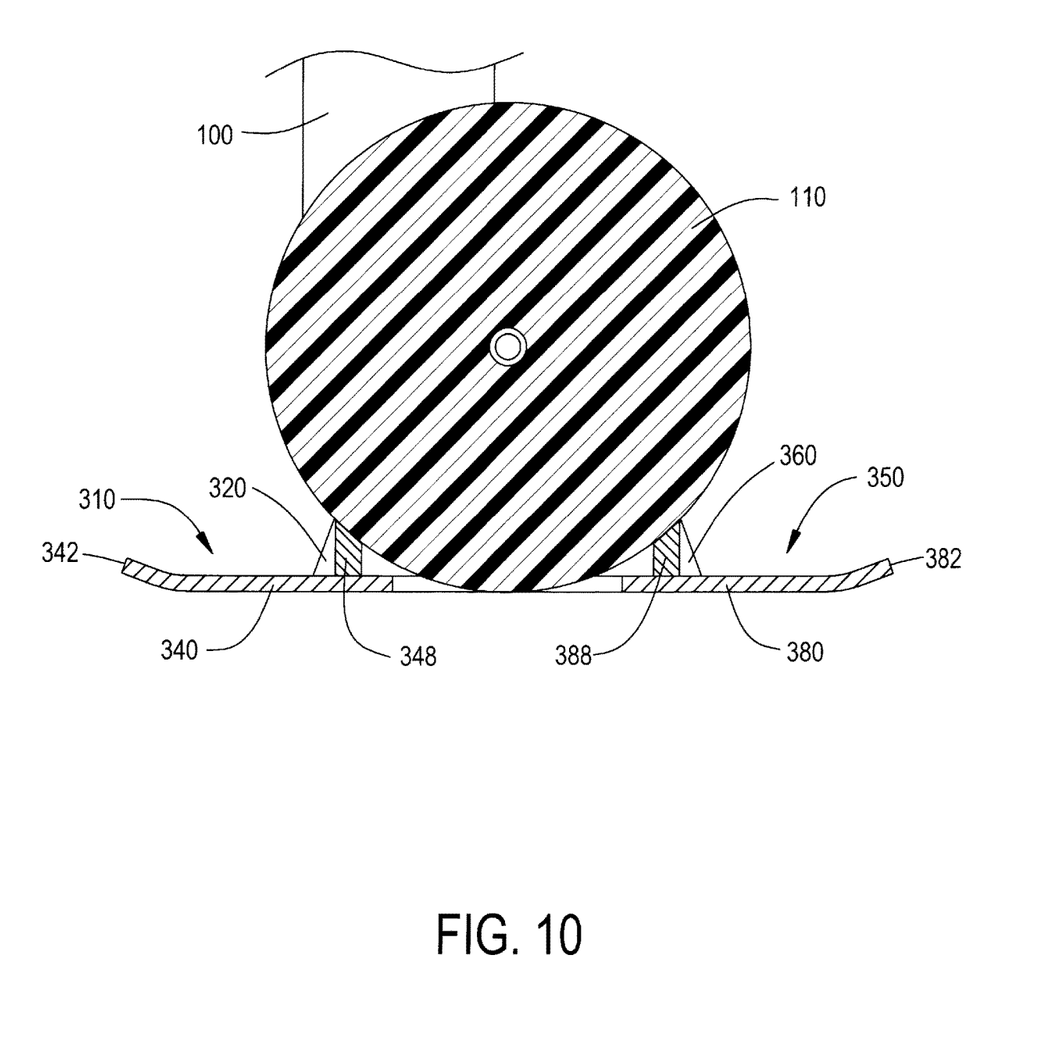
FIG. 10 depicts a cross-sectional view of the trailer foot illustrated in FIG. 9 taken along the plane 9-9.

In an engaged position or configuration illustrated in FIGS. 9-10, first pad 310 and second pad 350 are both deployed for use as a foot pad and wheel chock. To place the first pad 310 and second pad 350 in position to act as a flat foot pad and wheel chock to prevent movement of a wheel of a trailer jack, first pad 310 and second pad 350, respectively, are rotated to the engaged positions shown in FIGS. 9-10 so that first base 340 and second base 380 engage or contact the ground and opposite sides of wheel 110. In this configuration, first base 340 and second base 380 may be aligned in the substantially the same plane to engage the ground similar to a conventional foot pad. As illustrated in FIG. 9, overhang portions 315, 323 of first pad 310 contact the top surface of second base 380 and overhang portions 355, 363 of second pad 350 contact the top surface of first base 340 to assist in uniting and tying first pad 310 and second pad 350 together while in the engaged position.

In one embodiment, first pad 310 and second pad 350 may be secured together while in the engaged positions. In one example, first pad 310 is secured to second pad 350 by a draw clip 800, as illustrated in FIG. 9. Alternative securement mechanisms known in the art, such as, for example, other types of latches, hook, clips, buckles, catches or clamps, may be used to secure, connect and/or prevent separation of first pad 310 and second pad 350 while in the engaged positions. In another embodiment, first pad 310 and second pad 350 may be releasably secured together in manners known in the art while in the unengaged position to prevent either pad from rotating into an engaged position.

In the engaged position, inner edge 344 of first base 340 of first pad 310 may contact inner edge 384 of second based 380 of second pad 350 while U-shaped recess 346 of first base 340 substantially aligns with U-shaped recess 386 of second base 380. While in an engaged position, wheel 110 of a wheeled trailer jack 100 is received into the aligned U-shaped recesses 346, 386 of first and second pads 310, 350, respectively. In this configuration (as illustrated in FIG.

10), raised angled portion 348 projecting from first base 340 and raised angled portion 388 projecting from second base 380 contact opposing sides of wheel 110 and act as chocks on either side of wheel 110 to prevent movement or rotation of wheel 100.

In an unengaged position illustrated in FIG. 8, first pad 310 and second pad 350 are rotated so that first base 340 and second base 380 disengage or come out of contact with or away from the ground and wheel 110, and do not interfere with movement of a trailer. In the unengaged position, wheel 110 is allowed to freely rotate and the trailer may be moved on a flat surface. In one embodiment, first and second pads 310 and 350 may be retained or prevented from rotating into an engaged position by a catch or other mechanism that keeps first and second pads 310 and 350 from rotating into contact with the ground or a wheel of the trailer jack.

Trailer jack foot pad 300 constructed in accordance with one or more aspects of the present invention allows a trailer owner to alternate or change between a wheeled to a flat trailer jack without removing a component or having to lift the jack or trailer. Trailer jack foot pad 300 eliminates the need to purchase and retain a foot trailer jack and/or wheel chocks. Trailer jack foot pad 300 may be available to retrofit an existing wheeled trailer jack or incorporated into a new wheeled trailer jack. Foot pads 310 and 350 may be manufactured from many materials, including but not limited to plastic, polymers, polyvinyl chloride, high density polyethylene, polypropylene, nylon, ferrous and non-ferrous metals, their alloys and composites. The dual mode trailer jack allows ease of operation between deployment of first pad 310 and/or second pad 350 into and out of contact with a wheel.

Other attempts at manufacturing trailer jacks require changing out a wheel trailer jack with a flat foot pad jack or rotating between a wheel component and a foot pad component which requires lifting up an end of the trailer. In contrast, a trailer jack constructed in accordance with one or more aspects of the present invention was designed to avoid having to lift up an end of the trailer while providing a dual mode (e.g. wheeled and foot pad) trailer jack.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements so heretofore described, but which are commensurate with the spirt and scope of the invention. For example, in alternative embodiments, a trailer jack constructed in accordance with one or more aspects of the present invention may include only one of right pad 310 or left pad 350 removably and rotatable secured to the wheel axle or alternative axle supported by a shaft of the trailer jack. Additional, while various embodiments of the invention have been described, it is to be understood that aspects of the disclosure may include only some of the described embodiments. Accordingly, the invention is not to be seen as limited by the foregoing descriptions, but is only limited by the scope of the appended claims.

This written description uses examples to disclose certain aspects of the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

I claim:
1. A trailer jack, said trailer jack comprising:
 a shaft, said shaft mountable to a trailer body, said shaft including an end, the end having two struts that support a wheel rotatably mounted therebetween on an axle; and
 a trailer foot pad, said trailer foot pad including:
  a first foot pad, said first foot pad removably and rotatably secured to the axle, said first foot pad including a first base, a pair of flanges, mutually parallel and spaced apart to admit the wheel, attaching perpendicular to the first base, each flange including a first end proximate to the first base and an opposite second end, the second end of each flange having a hole configured to receive the axle, the first base including a first recess centrally located along an inner side, said first foot pad rotatable between a first engaged position and a first unengaged position, wherein a portion of one side of the wheel is received by the first recess and contacts the first base in the first engaged position; and
  a second foot pad, said second foot pad removably and rotatably secured to the axle, said second foot pad including a second base, a pair of flanges, mutually parallel and spaced apart to admit the wheel, attaching perpendicular to the second base, each flange including a first end proximate to the second base and an opposite second end, the second end of each flange having a hole configured to receive the axle, the second base including a second recess centrally located along an inner side, said second foot pad rotatable between a second engaged position and a second unengaged position, wherein a portion of an opposing side of the wheel is received by the second recess and contacts the second base in the second engaged position.

2. The trailer jack of claim 1, wherein the first base of said first foot pad and the second base of the second foot pad lie substantially in the same plane when said first foot pad is in the first engaged position and said second foot pad is in the second engaged position.

3. The trailer jack of claim 1, wherein said first foot pad engages the one side of the wheel as a chock in the first engaged position.

4. The trailer jack of claim 1, wherein said first foot pad includes an angled portion projecting from a top surface of the first base to engage the wheel and act as a chock in the first engaged position.

5. The trailer jack of claim 1, wherein said second foot pad engages the portion of the opposing side of the wheel as a chock in the second engaged position.

6. The trailer jack of claim 1, wherein said second foot pad includes an angled portion projecting from a top surface of the second base to engage the wheel and act as a chock in the first engaged position.

7. The trailer jack of claim 1, wherein said first foot pad is independently rotatable into the first engaged position from said second foot pad rotatable into the second engaged position.

8. The trailer jack of claim 1, wherein said first foot pad in the first engaged portion is detachably secured to said second foot pad in the second engaged position.

9. The trailer jack of claim 8, wherein said first foot pad is detachably secured to said second foot pad by a draw clamp.

10. A trailer foot pad for removable and rotatable attachment to a wheeled trailer jack, said trailer foot pad comprising:
- a first foot pad, said first foot pad removably and rotatably securable to the wheeled trailer jack, said first foot pad including a first base, a pair of flanges, mutually parallel and spaced apart to receive a wheel of the wheeled trailer jack, attaching perpendicular to the first base, each flange including a first end proximate to the first base and an opposite second end, the second end of each flange having a hole, each hole sharing the same longitudinal axis as the hole on the other flange, the first base including a first recess centrally located along an inner side;
- a second foot pad, said second foot pad removably and rotatably securable to the wheeled trailer jack, said second foot pad including a second base, a pair of flanges, mutually parallel and spaced apart to receive the wheel of the wheeled trailer jack, attaching perpendicular to the second base, each flange including a first end proximate to the second base and an opposite second end, the second end of each flange having a hole, each hole sharing the same longitudinal axis as the hole on the other flange, the second base including a second recess centrally located along an inner side,
- wherein, when assembled, said first foot pad and said second foot pad are rotatable into a position in which the first base of said first foot pad and the second base of the second foot pad lie substantially in the same plane.

11. The trailer foot pad of claim 10, wherein the longitudinal axis shared by the holes formed in the second end of the flanges of said first foot pad align with the longitudinal axis shared by the holes formed in the second end of the flanges of said second foot pad.

12. The trailer foot pad of claim 10, wherein the holes of the flanges of said first foot pad align with the holes of the flanges of said second foot pad, and wherein said first and second foot pads are rotatable around the shared longitudinal axis formed by this alignment.

13. The trailer foot pad of claim 10, wherein the first base of said first foot pad and the second base of said second foot pad are rotatable to align in substantially the same plane in one configuration.

14. The trailer foot pad of claim 10, wherein said first foot pad and second second pad are removeably and rotatably secured to a wheel axle of a wheeled trailer jack.

15. The trailer foot pad of claim 10, wherein said first foot pad and said second foot pad are removeably and rotatably secured to a shaft of a wheeled trailer jack.

16. A trailer jack, said trailer jack comprising:
- a shaft, said shaft mountable to a trailer body, said shaft including an end, the end having two struts that support a wheel rotatably mounted therebetween on an axle; and
- a trailer foot pad, said trailer foot pad including:
  - a first foot pad, said first foot pad removably and rotatably secured to the shaft, said first foot pad including a first base, a pair of flanges, mutually parallel and spaced apart to admit the wheel, attaching perpendicular to the first base, each flange including a first end proximate to the first base and an opposite second end, the second end of each flange having a hole sharing the same longitudinal axis as the axle, the first base including a first recess centrally located along an inner side, said first foot pad rotatable between a first engaged position and a first unengaged position, wherein a portion of one side of the wheel is received by the first recess and contacts the first base in the first engaged position;
  - a second foot pad, said second foot pad removably and rotatably secured to the shaft, said second foot pad including a second base, a pair of flanges, mutually parallel and spaced apart to admit the wheel, attaching perpendicular to the second base, each flange including a first end proximate to the second base and an opposite second end, the second end of each flange having a hole sharing the same longitudinal axis as the axle, the second base including a second recess centrally located along an inner side, said second foot pad rotatable between a second engaged position and a second unengaged position, wherein a portion of an opposing side to the one side of the wheel is received by the second recess and contacts the second base in the second engaged position.

* * * * *